United States Patent
Toyoshima et al.

(10) Patent No.: US 11,799,813 B2
(45) Date of Patent: Oct. 24, 2023

(54) COMMUNICATION SUPPORT SERVER, COMMUNICATION SUPPORT SYSTEM, COMMUNICATION SUPPORT METHOD, AND COMMUNICATION SUPPORT PROGRAM

(71) Applicant: Aill Inc., Tokyo (JP)

(72) Inventors: China Toyoshima, Tokyo (JP); Hidenori Kawamura, Hokkaido (JP)

(73) Assignee: AILL INC., Tokyo (JP)

( * ) Notice: Subject to any disclaimer, the term of this patent is extended or adjusted under 35 U.S.C. 154(b) by 71 days.

(21) Appl. No.: 17/599,320

(22) PCT Filed: Mar. 29, 2019

(86) PCT No.: PCT/JP2019/014178
§ 371 (c)(1),
(2) Date: Sep. 28, 2021

(87) PCT Pub. No.: WO2020/202314
PCT Pub. Date: Oct. 8, 2020

(65) Prior Publication Data
US 2022/0166737 A1 May 26, 2022

(51) Int. Cl.
*H04L 51/212* (2022.01)
*H04L 51/18* (2022.01)

(52) U.S. Cl.
CPC ............ *H04L 51/212* (2022.05); *H04L 51/18* (2013.01)

(58) Field of Classification Search
CPC ....... H04L 51/222; H04L 12/58; H04L 51/02; H04L 51/216; H04L 51/063; H04L 51/046; H04L 67/53
See application file for complete search history.

(56) References Cited

U.S. PATENT DOCUMENTS 2,016,122 A * 10/1935 Schmidt ................ G10D 11/00
    84/376 R
10,171,662 B1 * 1/2019 Zhou ...................... G10L 25/63
(Continued)

FOREIGN PATENT DOCUMENTS

JP          3052673        7/1998
JP      2007-200159     8/2007
(Continued)

OTHER PUBLICATIONS

Jun. 18, 2019 International Search Report issued in International Patent Application No. PCT/JP2019/014178 and English translation thereof.
(Continued)

*Primary Examiner* — Sargon N Nano
(74) *Attorney, Agent, or Firm* — Greenblum & Bernstein, P.L.C.

(57) ABSTRACT

A communication support server includes: a message content analysis unit configured to analyze a content of a message transmitted from a first terminal device used by a first user and/or a second terminal device used by a second user; an assistance necessity determination unit configured to determine whether assistance related to input of another message is necessary for the first user or the second user in accordance with the content of the message analyzed by the message content analysis unit; and an assist message generation unit configured to generate an assist message to be transmitted only to the first terminal device or the second terminal device in accordance with the content of the message analyzed, if the assistance necessity determination unit determines that assistance is necessary.

9 Claims, 7 Drawing Sheets

(56) References Cited

U.S. PATENT DOCUMENTS

| | | | | |
|---|---|---|---|---|
| 10,447,641 | B2* | 10/2019 | Agrawal | H04L 51/02 |
| 10,530,723 | B2* | 1/2020 | Milligan | H04L 51/02 |
| 10,999,434 | B1* | 5/2021 | Andar | G06N 5/04 |
| 2008/0065371 | A1* | 3/2008 | Nakano | G10L 15/22 |
| | | | | 704/E15.04 |
| 2009/0077159 | A1* | 3/2009 | Murakami | H04L 67/568 |
| | | | | 709/202 |
| 2009/0271031 | A1* | 10/2009 | Kwon | G06N 3/008 |
| | | | | 700/245 |
| 2011/0141919 | A1* | 6/2011 | Singh | H04L 41/0681 |
| | | | | 370/252 |
| 2014/0019464 | A1* | 1/2014 | Fujimoto | G06F 16/335 |
| | | | | 707/754 |
| 2014/0237057 | A1* | 8/2014 | Khodorenko | H04L 12/1831 |
| | | | | 709/206 |
| 2014/0297764 | A1* | 10/2014 | Skiba | H04L 51/046 |
| | | | | 709/206 |
| 2015/0103995 | A1* | 4/2015 | McCormack | H04M 3/5166 |
| | | | | 379/265.09 |
| 2015/0178388 | A1* | 6/2015 | Winnemoeller | G06Q 50/01 |
| | | | | 707/722 |
| 2015/0302301 | A1* | 10/2015 | Petersen | G06N 5/04 |
| | | | | 706/11 |
| 2017/0180276 | A1* | 6/2017 | Gershony | H04L 51/222 |
| 2017/0180294 | A1* | 6/2017 | Milligan | H04L 51/216 |
| 2017/0324867 | A1* | 11/2017 | Tamblyn | H04L 65/1093 |
| 2017/0373999 | A1* | 12/2017 | Abou Mahmoud | |
| | | | | G06Q 10/0631 |
| 2018/0054523 | A1* | 2/2018 | Zhang | G06F 16/90332 |
| 2018/0083894 | A1* | 3/2018 | Fung | H04L 51/02 |
| 2018/0083898 | A1* | 3/2018 | Pham | H04L 51/046 |
| 2018/0174020 | A1* | 6/2018 | Wu | G06N 3/08 |
| 2018/0367484 | A1* | 12/2018 | Rodriguez | H04L 67/75 |
| 2020/0092243 | A1* | 3/2020 | Milligan | H04L 51/216 |

FOREIGN PATENT DOCUMENTS

| | | |
|---|---|---|
| JP | 2014-63407 | 4/2014 |
| JP | 2016-110454 | 6/2016 |
| JP | 2017-84015 | 5/2017 |
| JP | 2019-508820 | 3/2019 |

OTHER PUBLICATIONS

Jan. 25, 2022 Japanese Office Action in Japanese Application No. 2021-511694, and English translation thereof.

"Marriage Activities Supported by AI with 1.8 Million Records," Nikkei Xtrend, Japan, Nikkei Business Publications, Inc., Jul. 14, 2018, No. 4, pp. 2-7 and English translation thereof.

"Our Chat is Being Analyzed! I Tried Using AILL, Part 1," pp. 2-4, online Feb. 22, 2019, searched on Jan. 17, 2022, URL:https://ameblo.jp/apple2454/entry-12439990475.html, and English translation thereof.

"Found and Registered to Trial of Matching Service," online, Jan. 30, 2019, pp. 2-4, URL:https://ameblo.jp/apple2454/entry-12436461002.html; and English translation thereof.

"Is Artificial Intelligence Smart? I Tried Using AILL, Part 2," online Feb. 23, 2019, searched on Jan. 17, 2022, pp. 2-5, URL: https://ameblo.jp/apple2454/entry-12440475206.html; and English translation thereof.

Office Action from Japan Patent Office (JPO) in Japanese Patent Appl. No. 2022-085587, dated Aug. 22, 2023, together with an English language translation.

* cited by examiner

COMMUNICATION SUPPORT SERVER, COMMUNICATION SUPPORT SYSTEM, COMMUNICATION SUPPORT METHOD, AND COMMUNICATION SUPPORT PROGRAM

TECHNICAL FIELD

The present invention relates to a communication support server, a communication support system, a communication support method, and a communication support program that support communications between people via a network.

BACKGROUND ART

Social networking services (SNSs) are widely used as a communication tool between people via a network. The SNSs often have chat, messenger, and other functions to allow real time communications. In provided techniques, systems intervene in communications among people to establish smoother communications.

Patent Document 1 describes determining whether the words input during a chat include recommended or non-recommended words. If the input words are determined to include non-recommended words, the output of such words is restricted. If the input words are determined to include recommended words, a praise message is displayed.

CITATION LIST

Patent Document

Patent Document 1: Japanese Unexamined Patent Publication No. 2016-110454

SUMMARY OF THE INVENTION

Technical Problem

Patent Document 1 describes analyzing the input words to determine whether the words are to be displayed or the display is to be restricted, but fails to describe encouraging the inputter to input recommended words and refrain from inputting non-recommended words in accordance with the context of the chat.

Patent Document 1 thus fails to describe assisting, based on the flow of the chat between two people, one of the two people to input better comments at a better time. More advanced smoothing of communications may thus be difficult.

The present invention was made to solve such the problem. It is thus an objective of the present invention to provide a communication support server, a communication support system, an inspected communication support method, and an inspected communication support program that assist people during a communication via a chat to input better comments at a better time.

Solution to the Problem

In order to achieve the objective, a communication support server according to the present invention includes: a message content analysis unit configured to analyze a content of a message transmitted from a first terminal device used by a first user and/or a second terminal device used by a second user; an assistance necessity determination unit configured to determine whether assistance related to input of another message is necessary for the first user or the second user in accordance with the content of the message analyzed by the message content analysis unit; and an assist message generation unit configured to generate an assist message to be transmitted only to the first terminal device or the second terminal device in accordance with the content of the message analyzed, if the assistance necessity determination unit determines that assistance is necessary.

The assistance necessity determination unit may determine whether the assist message is to be generated for the first user or the second user in accordance with the content of the message analyzed by the message content analysis unit.

The message content analysis unit may calculate a degree of good feeling of the second user for the first user based on a message transmitted from the first terminal device and a message transmitted from the second terminal device.

The communication support server may further include: a control unit configured to transmit, to the first terminal device, the degree of good feeling of the second user for the first user calculated by the message content analysis unit.

The assistance necessity determination unit may determine whether the assistance related to the input of the other message is necessary for the first user or the second user based on the degree of good feeling together with the content of the message analyzed.

The communication support server may further include: a message storage unit configured to store the message transmitted from the first terminal device and the message transmitted from the second terminal device. The message content analysis unit may analyze the content of the message based on a plurality of messages stored in the message storage unit.

The communication support server may further include: a personal information storage unit configured to store first personal information that is personal information on the first user and second personal information that is personal information on the second user; and a matching candidate extraction unit configured to determine a matching rate between the first user and the second user based on the first personal information and the second personal information, and determines whether the matching rate satisfies a predetermined condition. If the matching rate is determined to satisfy the predetermined condition, the matching candidate extraction unit may generate friend request information for the first terminal device and/or the second terminal device.

The message content analysis unit may store, as the first personal information and/or the second personal information, the content of the message analyzed.

In order to achieve the objective, a communication support system according to the present invention includes: a first terminal device used by a first user; a second terminal device used by a second user; and a communication support server connectable to the first terminal device and the second terminal device via a network, the communication support server including: a message content analysis unit configured to analyze a content of a message transmitted from the first terminal device and/or the second terminal device; an assistance necessity determination unit configured to determine whether assistance related to input of another message is necessary for the first user or the second user in accordance with the content of the message analyzed by the message content analysis unit, and an assist message generation unit configured to generate an assist message to be transmitted only to the first terminal device or the second terminal device in accordance with the content of the message analyzed, if the assistance necessity determination unit determines that assistance is necessary.

In order to achieve the objective, a communication support method according to the present invention includes: analyzing a content of a message transmitted from a first terminal device used by a first user and/or a second terminal device used by a second user, using a message content analysis unit; determining whether assistance related to input of another message is necessary for the first user or the second user in accordance with the content of the message analyzed by the message content analysis unit, using an assistance necessity determination unit; and if the assistance necessity determination unit determines that assistance is necessary, generating an assist message to be transmitted only to the first terminal device or the second terminal device in accordance with the content of the message analyzed, using an assist message generation unit.

In order to achieve the objective, a communication support program according to the present invention includes: analyzing a content of a message transmitted from a first terminal device used by a first user and/or a second terminal device used by a second user; determining whether assistance related to input of another message is necessary for the first user or the second user in accordance with the content of the message analyzed; and if assistance is determined to be necessary, generating an assist message to be transmitted only to the first terminal device or the second terminal device in accordance with the content of the message analyzed.

Advantages of the Invention

The communication support server, the communication support system, the inspected communication support method, and the inspected communication support program according to the present invention using the means described above assist people during a communication via a chat to input better comments at a better time.

DESCRIPTION OF EMBODIMENT

An embodiment of the present invention will now be described with reference to the drawings.

<Configuration>

Figure 1:
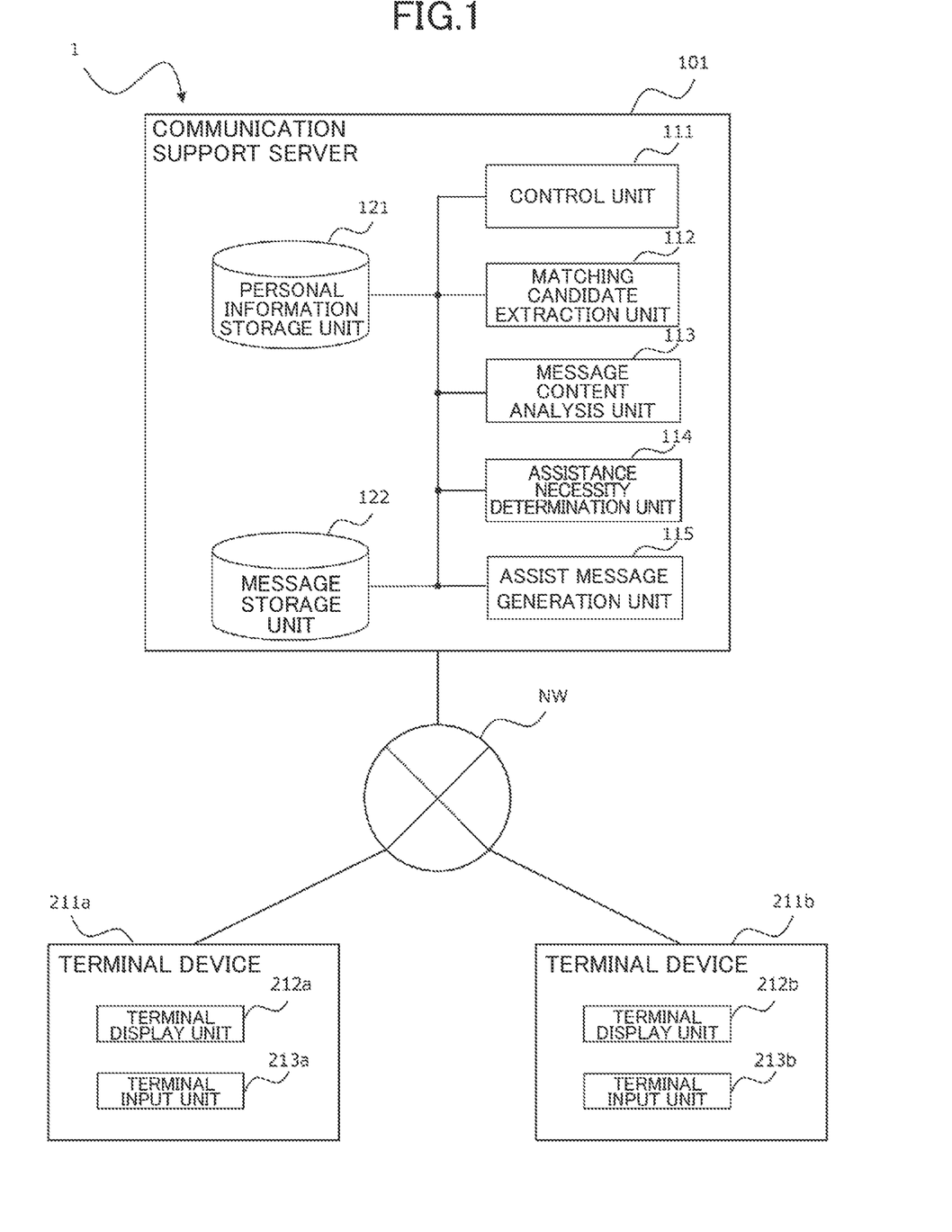
FIG. 1 is a system configuration diagram showing a communication support system according to an embodiment of the present invention.

FIG. 1 is a system configuration diagram showing a communication support system 1 including a communication support server 101 according to an embodiment of the present invention. The communication support system 1 is operated by a service provider (hereinafter, referred to as a "provider") to support registered users in matching each other, and supports the users who have become friends as a result of the matching in establishing communications. Specifically, the service proposes matching candidates among a plurality of users who have registered their requirements for a partner to be matched and their personal information, and becomes friends after submitting and accepting friend requests. Users who have become friends communicate with each other via chats. The communication support system 1 aims to establish smooth communications by intervening in communications in accordance with the contents of messages during the chats and assisting the users. In the present invention, the terms "assist" and "assistance" mean actions such as advices, proposals, or recommendations.

The users of the service register their personal information at the time of service registration. The personal information on each user includes the items, such as the information on the username (or nickname), age, occupation, income, hobbies, sense of values, and life plan, which are input as the user's own profile at the time of registration, and the items such as the age, occupation, income, hobbies, sense of values, and life plan, which are required for a matching partner. Further, the personal information on each user may include characteristic information indicating the characters according to the contents of the messages in the past chats in the communication support system 1.

As shown in FIG. 1, the communication support system 1 according to this embodiment is configured by connecting terminal devices 211 (e.g., terminal devices 211a and 211b) of the users and the communication support server 101 of the provider via a network NW such as the Internet or a virtual private network (VPN). For the sake of simplicity, FIG. 1 shows only the terminal device 211a (i.e., a first terminal device) and the terminal device 211b (i.e., a second terminal device) assuming two users. The communication support server 101 may be however connected to three or more users via the network NW.

The communication support server 101 includes a control unit 111, a matching candidate extraction unit 112, a message content analysis unit 113, an assistance necessity determination unit 114, an assist message generation unit 115, a personal information storage unit 121, and a message storage unit 122.

The control unit 111 controls exchanges of information among the terminal devices 211a and 211b and the communication support server 101.

The matching candidate extraction unit 112 extracts matching candidates from personal information on a plurality of users stored in the personal information storage unit 121 which will be described later. Specifically, the matching candidate extraction unit 112 weights and scores information on the age, annual income, and hobbies, for example, recorded as the personal information on the other users to calculate matching rates, and extracts the users with high matching rates as the matching candidates. The personal information may include characteristic information as indexes of the characters analyzed based on the message exchanges of the users in the past. For example, a user who has input messages in accordance with assist messages in the past message exchanges may be provided with the characteristic information with an index indicating that the user is a "amenable person". The matching candidates may be then extracted in accordance with the characteristic information. The matching candidate extraction unit 112 generates and transmits friend request information to the users extracted as the matching candidates. The matching candidate extraction unit 112 may extract the matching candidates through machine learning trained using, as training data, past interactions between the users and matching conditions.

The message content analysis unit 113 analyzes the contents of the messages input by a user A (or a first user) or a user B (or a second user). The message content analysis unit 113 may analyze the contents of the messages based on the flows of the message exchanges. Specifically, for example, the analysis may be made based on the information such as the length of each message, the number of messages once each chat starts, and the duration of each message exchange in a plurality of message exchanges. The analysis may be made in comparison with the other users. For example, the interchanges between the users A and B may be compared to those between the users A and another user (i.e., other than the user B) or between other users to analyze whether the flow is positive or negative. In addition, the message content analysis unit 113 may analyze the contents of the messages to calculate the user A's degree of good feeling for the user B and the user B's degree of good feeling for the user A. For example, if positive conversations are found in the past message exchanges between the users A and B, the degree of good feeling is increased, whereby higher degree of good feeling is calculated. On the other hand, if negative conversations are found, the degree of good feeling is decreased, whereby lower degree of good feeling is calculated. The information on the user A's degree of good feeling for the user B calculated by the message content analysis unit 113 is transmitted through the control unit 111 to the terminal device 211b of the user B. On the other hand, the information on the user B's degree of good feeling for the user A calculated by the message content analysis unit 113 is transmitted through the control unit 111 to the terminal device 211a of the user A. The message content analysis unit 113 may analyze messages through machine learning trained using, as training data, past message exchanges.

The assistance necessity determination unit 114 determines whether assistance through intervention by the communication support server 101 is necessary for the message exchanges between the users A and B based on the contents of the messages analyzed by the message content analysis unit 113. For example, if the user B makes a negative response to a positive offer by the user A, the assistance necessity determination unit 114 determines that assistance is necessary for the user A to improve the situation. In addition, if the B's degree of good feeling for the user A satisfies a predetermined value, the assistance necessity determination unit 114 determines that there is a need to transmit an assist message causing the user A to communicate positively.

The assistance necessity determination unit 114 determines to transmit an assist message either the user A or B. For example, determining that the user A has lower activeness as a result of analyzing messages, the assistance necessity determination unit 114 determines to transmit an assist message to the user B to cause the user B to lead the communication. For example, assume that the contents of the messages input by the user A strongly tend not to follow the contents of assist messages for the user A. That is, determining that the user A does not follow the assist messages, the assistance necessity determination unit 114 may determine to transmit an assist message to the user B.

The assist message generation unit 115 generates assist messages according to the analyzed contents of the messages. The assist message generation unit 115 may generate assist messages suitable for the analyzed contents of the messages through machine learning trained using, as training data, the past message exchanges and their results such as the information on whether the communications have proceeded smoothly.

The personal information storage unit 121 stores the personal information on the users registered in the service. The personal information storage unit 121 further stores the users' degrees of good feeling for other users. For example, the personal information storage unit 121 stores the user A's degree of good feeling for the user B and the user B's degree of good feeling for the user A in association with their personal information.

The message storage unit 122 stores the contents of messages in chats between users.

The terminal devices 211 (e.g., the terminal devices 211a and 211b) are portable terminals such as PCs, smartphones, tablet PCs, and cellular phones, and are terminals capable of displaying at least web information. The terminal devices 211 (e.g., the terminal devices 211a and 211b) may access the communication support server 101 using dedicated application software installed therein. The terminal devices 211 may access the communication support server 101 under an operating environment (e.g., an application programming interface (API) or a platform) provided by the communication support server 101.

Each terminal display unit 212 (e.g., a terminal display unit 212a or 212b) is a display unit such as a liquid crystal display or an organic EL display of a smartphone. Alternatively, each terminal display unit 212 may be a display device independent from the associated one of the terminal devices 211. Each terminal display unit 212 displays the messages transmitted from the communication support server 101 or information on the degree of good feeling.

Each terminal input unit 213 (e.g., a terminal input unit 213a or 213b) is, for example, an input device such as a touch panel integral with the associated one of the terminal display units 212 (e.g., the terminal display units 212a and 212b) such as the liquid crystal displays or the organic EL displays of the smartphones. Alternatively, each terminal input unit 213 may be a keyboard independent from the associated one of the terminal display units 212 (e.g., the terminal display units 212a and 212b) or from the associated one of the terminal devices 211. Further alternatively, each terminal input unit 213 may be an audio input device.

<Terminal Device Screen>

Now, display screens that may be displayed on the terminal devices 211 according to the embodiment of the present invention will be described with reference to FIGS. 2 to 5.

Figure 2:
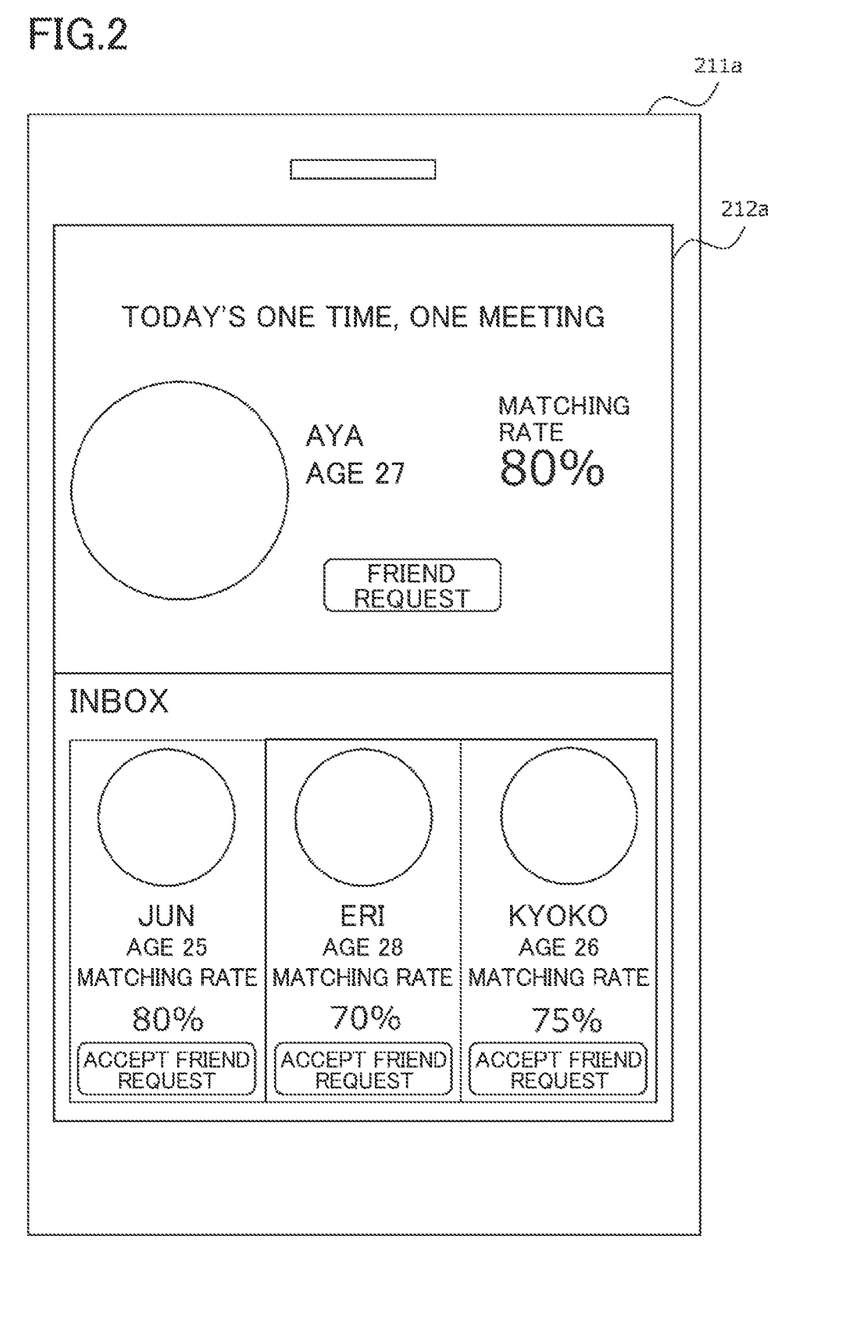
FIG. 2 is a schematic diagram showing a screen of a terminal device 211a of a user A after receiving matching candidate information.

FIG. 2 is a schematic diagram showing the terminal device 211a of the user A at the time of notifying the users of matching candidates. FIG. 2 is a screen showing that the user B, Aya is introduced as a matching candidate to the user A, Kenta. The screen also shows that the matching rate between Kenta and Aya is 80%. If Kenta likes Aya, Kenta presses the button "FRIEND REQUEST" displayed based on the friend request information to make a friend request to Aya. In the lower half of the screen, "INBOX" indicates the users who have made a friend request to Kenta. The screen also shows that the matching rate between Kenta and Jun is 80%, between Kenta and Eri 70%, and between Kenta and Kyoko 75%. For example, if Kenta likes Jun, Kenta presses the bottom "ACCEPT FRIEND REQUEST" under "JUN" to become friends with Jun.

Figure 3:
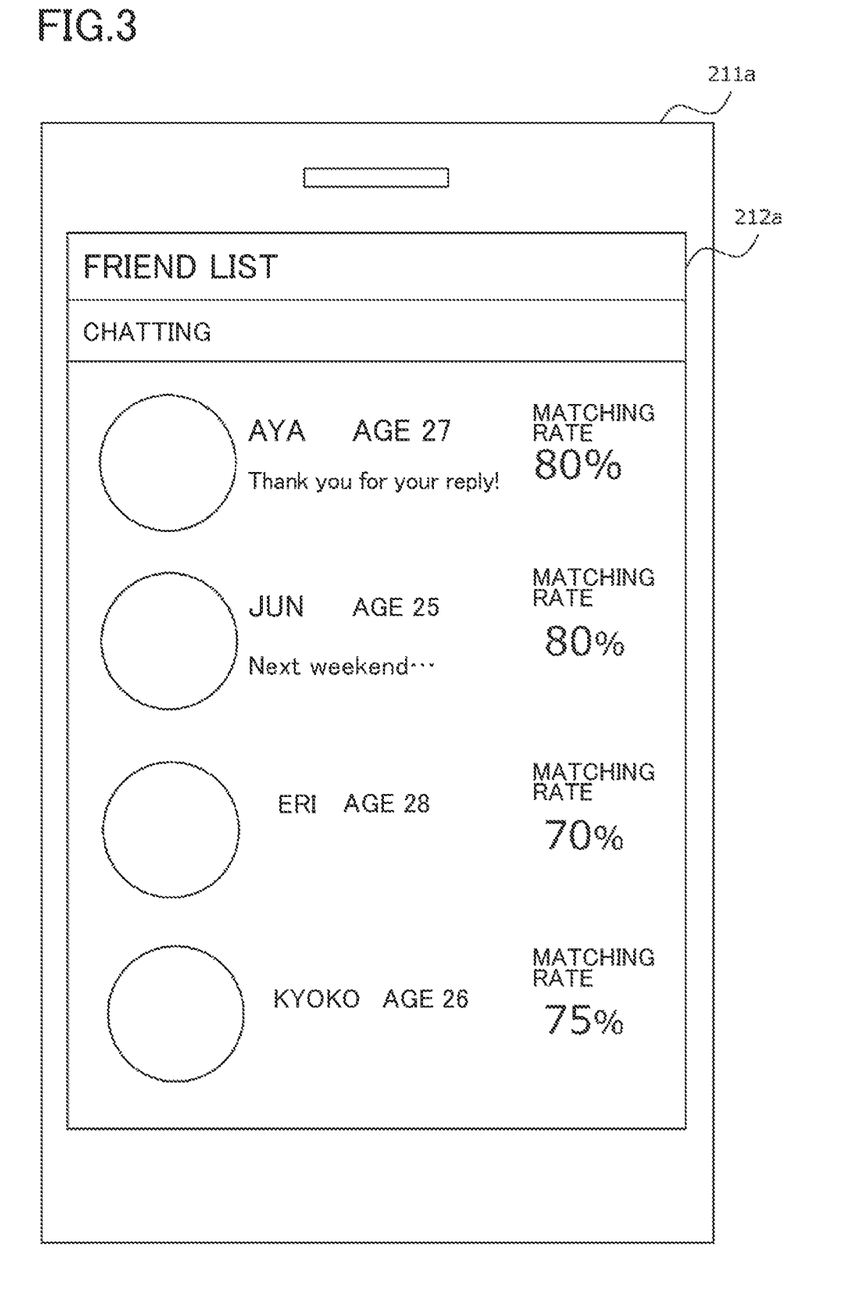
FIG. 3 is a schematic diagram showing a screen of the terminal device 211a of the user A displaying the friend list of the user A.

FIG. 3 is a schematic diagram showing the terminal device 211a displaying the friend list of the user A, Kenta. The user A selects a friend to shift to the chat screen and exchange messages via a chat.

Figure 4:
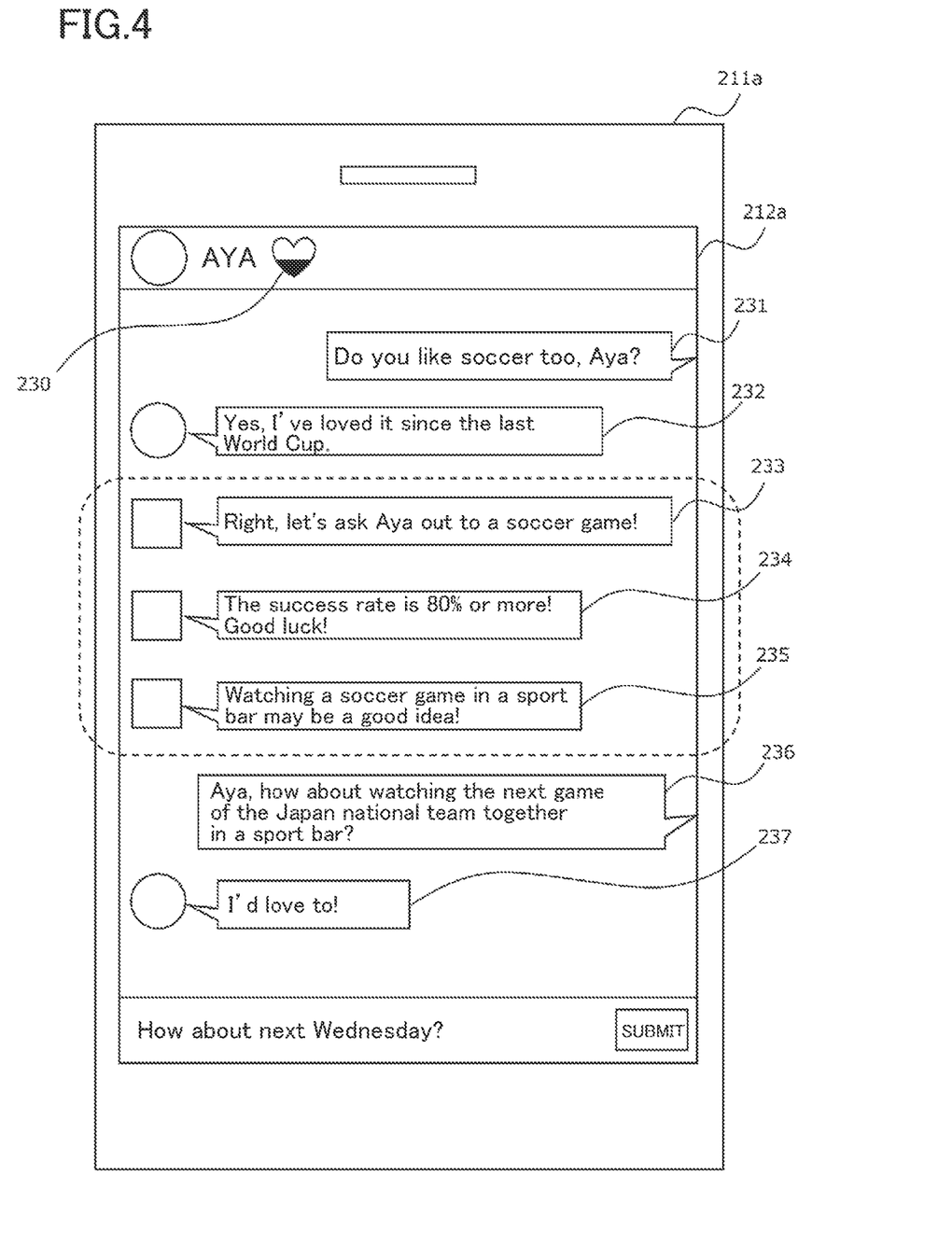
FIG. 4 is a schematic diagram showing a screen of the terminal device 211a of the user A during a chat with a user B.

FIG. 4 is a schematic diagram showing a screen of the terminal device 211a of the user A, Kenta during a chat with the user B, Aya. A gauge 230 is a display indicating the user B's degree of good feeling for the user A. A higher level of the gauge means a higher degree of good feeling. Through the gauge 230, the user A timely knows the degree of good feeling of the chatting partner, that is, the user B. The gauge 230 may thus be a motivation to consider further message contents according to the displayed degree of good feeling. Messages 231 and 236 have been input by the user A, while messages 232 and 237 have been input by the user B. Messages 233, 234, and 235 (surrounded by a dotted line) have been generated by the assist message generation unit 115 of the communication support server 101.

Figure 5:
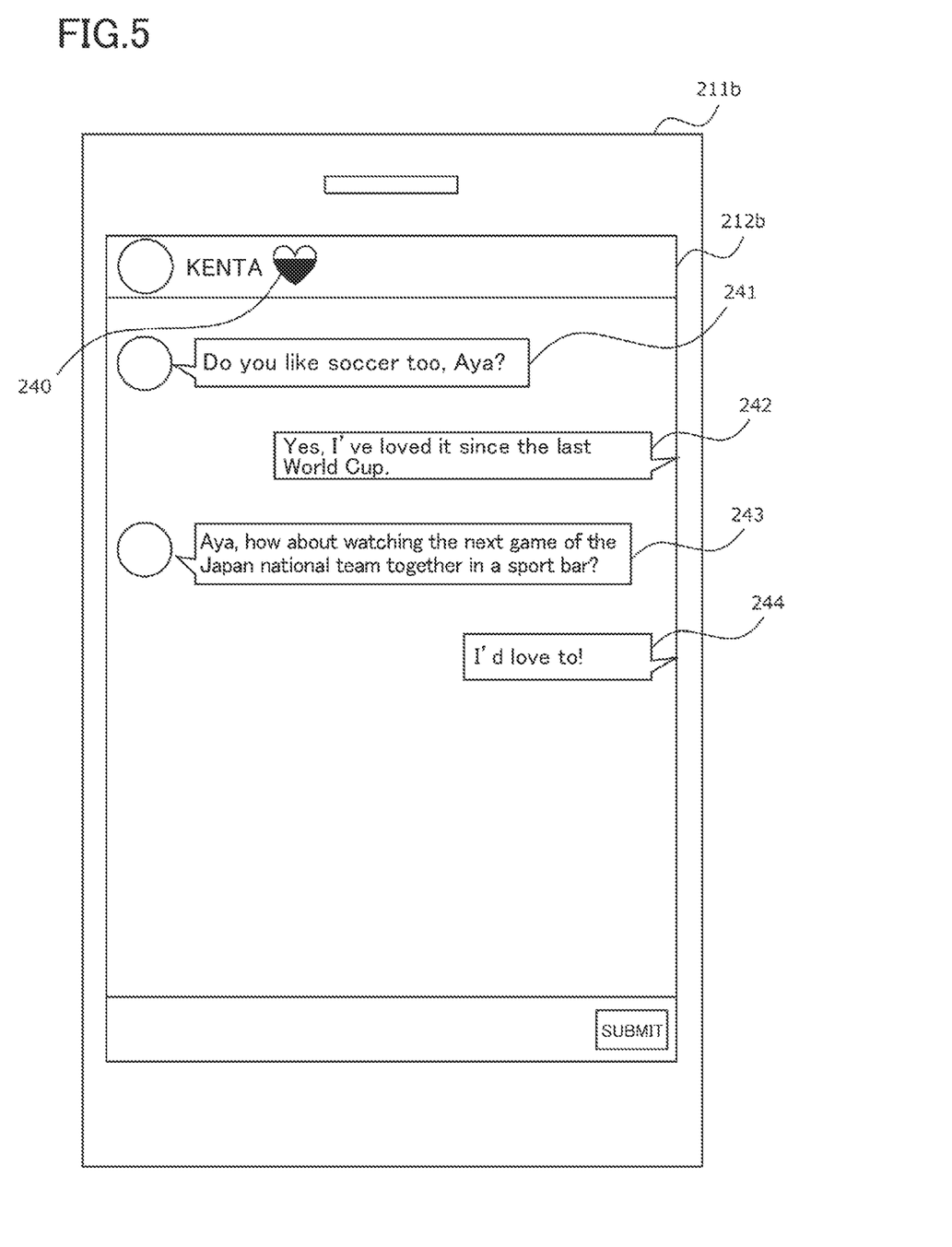
FIG. 5 is a schematic diagram showing a screen of a terminal device 211b of the user B during the chat with the user A.

FIG. 5 is a schematic diagram showing a screen of the terminal device 211b of the user B, Aya during the chat with the user A, Kenta. A gauge 240 is a display indicating the user A's degree of good feeling for the user B. A higher level of the gauge means a higher degree of good feeling. Through the gauge 240, the user B timely knows the degree of good feeling of the chatting partner, that is, the user A The gauge 240 may thus be a motivation to consider further message contents according to the displayed degree of good feeling. Messages 241 and 243 have been input by the user A, while messages 242 and 244 have been input by the user B.

These messages are also displayed in FIG. 4 and thus visible to both the users A and B. However, the messages 233, 234, and 235 in FIG. 4 have been generated as a result of determination by the assistance necessity determination unit 114 that an assist message for the user A is necessary, and thus are visible only to the user A, that is, displayed only on the terminal display unit 212a of the terminal device 211a. Accordingly, the user A can follow the assistance without the assist message known by the communication partner.

<Processing Flow>

Now, an operation of the communication support system 1 according to this embodiment of the present invention will be described with reference to the flowchart shown in FIG. 6.

Figure 6:
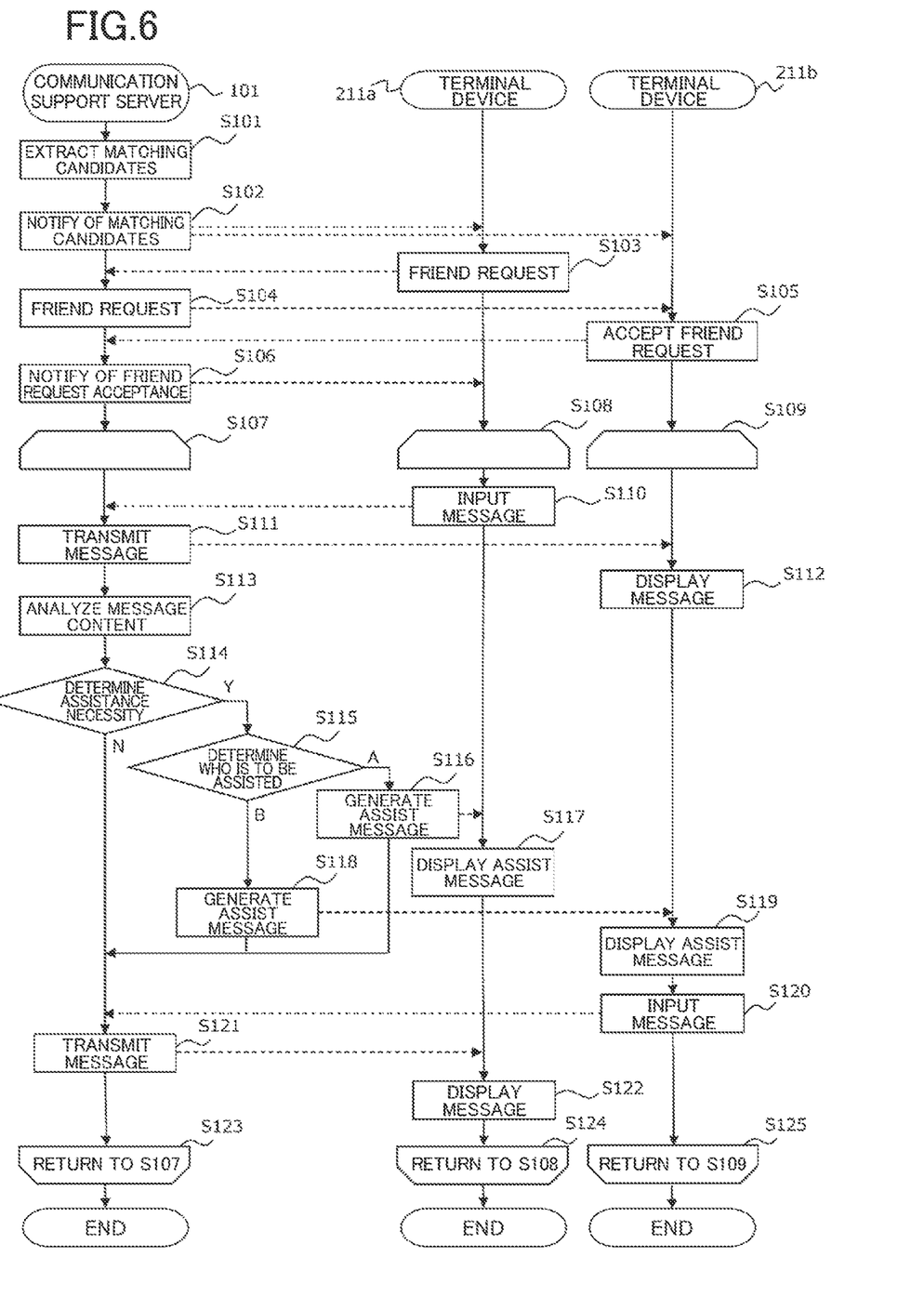
FIG. 6 is a flowchart showing an operation procedure of a communication support system 1 according to the embodiment of the present invention.

The flowchart of FIG. 6 shows the relationship among the operations of the communication support server 101, the terminal device 211a of the user A, and the terminal device 211b of the user B.

In step S101, the matching candidate extraction unit 112 of the communication support server 101 extracts matching candidates based on the personal information on a plurality of users stored in the personal information storage unit 121. The personal information may include characteristic information as indexes of the characters analyzed based on the message exchanges of the users in the past. The matching candidates may be then extracted in accordance with the characteristic information.

In step S102, the control unit 111 notifies each of the matching candidates extracted in step S101 of matching candidate information, which corresponds to the information "TODAY'S ONE TIME. ONE MEETING" in FIG. 2. Specifically, the information on a matching candidate, for example, the information on the user A is transmitted to the terminal device 211b, and the information on the user B is transmitted to the terminal device 211a.

In step S103, if the user A who has received the matching candidates in step S102 likes the user B, the user A may make a friend request. Specifically, the user A presses the button "FRIEND REQUEST" on the terminal input unit 213a of the terminal device 211a to transmit the information on the friend request to the communication support server 101.

In step S104, based on the information on the friend request transmitted in step S103, the control unit 111 transmits the information to user B. Specifically, the control unit 111 transmits the friend request information from the user A to the terminal device 211b.

In step S105, if the user B who has received the friend request information in step S104 likes the user A, the user B may accept the friend request. Specifically, the user B presses the button "ACCEPT FRIEND REQUEST" on the terminal input unit 213b of the terminal device 211b to transmit the information on the friend request acceptance to the communication support server 101.

In step S106, the control unit 111 notifies the user A that the user B has accepted the friend request. Specifically, the control unit 111 transmits the information on the friend request acceptance to the terminal device 211a to notify the user A that the user A and the user B are ready to exchange messages.

In step S107, the communication support server 101 repeats the processing to step S123. This processing is synchronized with the repetitive processing by the terminal device 211a in steps S108 to S124 and by the terminal device 211b in steps S109 to S125. Once the repetitive processing by the terminal device 211a or 211b ends, the repetitive processing in steps S107 to S123 ends.

In step S108, the terminal device 211a repeats the processing in steps S108 to S124. Similarly, in step S109, the terminal device 211b repeats the processing in steps S109 to S125.

In step S110, the user A inputs the messages to be transmitted to the user B through the terminal input unit 213a of the terminal device 211a. The terminal device 211a transmits the input messages to the communication support server 101.

In step S111, the control unit 111 transmits the messages transmitted in step S110 to the user B. Specifically, the messages transmitted in step S110 are stored in the message storage unit, and the stored messages are transmitted to the terminal device 211b of the user B.

In step S112, the terminal device 211b displays the messages transmitted in step S111 on the terminal display unit 212b.

In step S113, the message content analysis unit 113 analyzes the contents of the messages stored in step S111. The message may be analyzed together with the messages transmitted in the past or the messages transmitted from the user B. In addition, the message content analysis unit 113 may analyze the contents of the messages to calculate the user A's degree of good feeling for the user B and the user B's degree of good feeling for the user A.

In step S114, the assistance necessity determination unit 114 determines whether assistance through intervention by the communication support server 101 is necessary for the message exchanges between the users A and B based on the contents of the messages analyzed in step S113. Alternatively, the assistance necessity determination unit 114 determines whether assistance through intervention by the communication support server 101 is necessary for the message exchanges between the users A and B based on the degrees of good feeling calculated in step S113.

In step S115, the assistance necessity determination unit 114 determines whether to transmit an assist message to either the user A or B. For example, determining that the user A has lower activeness as a result of analyzing messages, the assistance necessity determination unit 114 determines to transmit an assist message to the user B to cause the user B to lead the communication. If the assistance necessity determination unit 114 determines that there is a need to transmit an assist message to the user A, the processing proceeds to step S116. If the assistance necessity determination unit 114 determines that there is a need to transmit an assist message to the user B, the processing proceeds to step S118.

In step S116, the assist message generation unit 115 generates an assist message for the user A. For example, as shown in FIG. 4, the displayed assist message may be "Right, let's ask Aya out to a soccer game!", "The success rate is 80% or more! Good luck!", or "Watching a soccer game in a sport bar may be a good idea!" The control unit 111 transmits the generated assist message to the terminal device 211a.

In step S117, the terminal device 211a displays the assist message transmitted in step S116 only on the terminal display unit 212a. In accordance with the displayed assist message, the user A may input a message in step S10, for example, and transmit the message to the user B. Step S117 may be skipped, if no assist message has been generated in step S116.

In step S118, the assist message generation unit 115 generates an assist message for the user B. The control unit 111 transmits the generated assist message to the terminal device 211a.

In step S119, the terminal device 211b displays the assist message transmitted in step S118 only on the terminal display unit 212b. The user B may input a message in accordance with the displayed assist message in step S120, for example, and transmit the message to the user A. Step S119 may be skipped, if no assist message has been generated in step S118.

In step S120, the user B inputs the messages to be transmitted to the user A through the terminal input unit 213b of the terminal device 211b. The terminal device 211b transmits the input messages to the communication support server 101.

In step S121, the control unit 111 transmits the messages transmitted in step S120 to the user A. Specifically, the messages transmitted in step S120 are stored in the message storage unit, and the stored messages are transmitted to the terminal device 211a of the user A.

In step S122, the terminal device 211a displays the messages transmitted in step S111 on the terminal display unit 212a.

In step S123, the communication support server 101 repeats the processing from step S107. As described above, once the repetitive processing by the terminal device 211a or 211b ends, the repetitive processing in steps S107 to S123 ends.

In step S124, the terminal device 211a repeats the processing in steps S108 to S124. Similarly, in step S125, the terminal device 211b repeats the processing in steps S109 to S125. If the user A or B wishes to end the message exchange, the repetitive processing ends.

As described above, the communication support system 1 according to this embodiment analyzes the contents of the messages input by the users, transmits assist messages according to the analyzed contents of the messages to the users for notification to establish smooth communications between the users. The assist messages may be generated based on the data on the past message exchanges to establish smoother communications through messages. The communication support system 1 merely presents assist messages to the users. Even when following the assist messages, the user inputs the messages by himself/herself, which does not hinder the user's intention.

The assistance necessity determination unit 114 determines whether to transmit an assist message to either the user A or B, thereby selecting the user who can lead the communication, and transmitting the assist message to the selected user. This allows the user to take the initiative in the communication and establishes a smoother communication through messages.

The assistance necessity determination unit 114 may function not only to determine whether assistance is necessary, but also to temporarily stop the transmission of the messages input by one of the users to the other. For example, the assist message generation unit 115 generates an assist message such as "it is better not to transmit any message now" for the user for notification. At the same time, buttons for selecting whether to transmit a message may be displayed on the terminal device 211 of the user. The user may transmit the input message as his wish. This allows the user to stop transmitting a message at a wrong time and establish a smoother communication through messages.

In the description of the flow, the contents of the messages are analyzed after the transmission. Alternatively, every time when the communication support server 101 receives an input message, the content of the message may be analyzed. The users A and B may not alternately input messages but one of the users A and B may continuously input messages.

(Program)

Now, details of a program for fulfilling the functions constituting the communication support server 101 according to this embodiment will be described.

Figure 7:
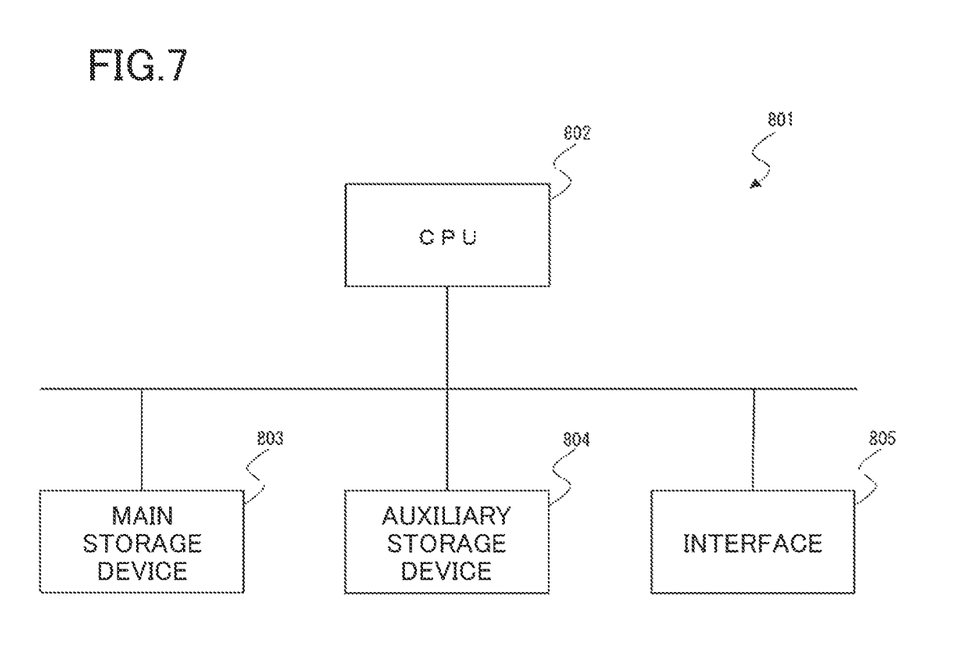
FIG. 7 is a schematic block diagram showing a configuration of a computer according to the embodiment of the present invention.

The communication support server 101 is mounted in a computer 801 shown in FIG. 7. The operations of the components of the communication support server 101 are stored in the form of a program in an auxiliary storage device 804. A CPU 802 reads the program from the auxiliary storage device 804, loads the program in a main storage device 803, and executes the processing described above in accordance with the program. In accordance with the program, the CPU 802 secures, in the main storage device 803, a storage area corresponding to the storage unit.

Specifically, the program causes a computer to execute: analyzing a content of a message transmitted from a first terminal device used by a first user and/or a second terminal device used by a second user; determining whether assistance related to input of another message is necessary for the first user or the second user in accordance with the content of the message analyzed; and if assistance is determined to be necessary, generating an assist message to be transmitted only to the first terminal device or the second terminal device in accordance with the content of the message analyzed.

The auxiliary storage device is an example of a tangible, non-transitory medium. Other examples of the tangible, non-transitory medium include a magnetic disk, a magneto-optical disk, a CD-ROM, a DVD-ROM, and a semiconductor memory connected via an interface. If this program is distributed to a computer via a network, the computer distributed with the program may load the program in its main storage device to execute the processing described above.

The program may fulfill some of the functions described above. Further, the program may be a what is called a "difference file" (or "difference program") that fulfills the functions described above in combination with another program already stored in the auxiliary storage device.

The embodiment described above may be implemented in other various forms, various omissions, substitutions and changes may be made without departing from the spirit of the invention. The embodiment and variations thereof are included in the scope and spirit of the invention and also in the scope of the invention recited in the claims and equivalents thereof. The present invention is applicable to the occasion where support of communications is necessary between two or more people for a business negotiation, a BtoB transaction, recruiting activities, communications between a couple, and expansion of friendship.

DESCRIPTION OF REFERENCE CHARACTERS

1 Communication Support System
101 Communication Support Server
111 Control Unit
112 Matching Candidate Extraction Unit
113 Message Content Analysis Unit
114 Assistance Necessity Determination Unit
115 Assist Message Generation Unit
121 Personal Information Storage Unit
122 Message Storage Unit
211, 211a, 211b Terminal Device
212, 212a. 212b Terminal Display Unit
213, 213a, 213b Terminal Input Unit
801 Computer
802 CPU
803 Main Storage Device
804 Auxiliary Storage Device
805 Interface
NW Network

The invention claimed is:

1. A communication support server comprising:
a processor; and
a memory including a program that, when executed by the processor, causes the processor to:
analyze a content of a message transmitted from at least one of a first terminal device used by a first user or a second terminal device used by a second user;
determine whether assistance to stop the first user or the second user from transmitting another message is necessary in accordance with the content of the message analyzed by the processor;
generate an assist message to be transmitted only to the first terminal device or the second terminal device in accordance with the content of the message analyzed, if the processor determines that the assistance is necessary, the assist message being to stop the first user or the second user who has input the another message from transmitting the another message; and
transmit, to the first terminal device or the second terminal device, the assist message,
wherein the processor functions to stop transmission of the another message input by the first user or the second user in accordance with the content of the message analyzed by the processor,
the assist message informs the first user or the second user that not transmitting the another message now is better than transmitting the another message now, and
the processor calculates a degree of good feeling of the second user for the first user based on a message transmitted from the first terminal device and a message transmitted from the second terminal device.

2. The communication support server of claim 1, wherein the processor determines whether the assist message is to be generated for the first user or the second user in accordance with the content of the message analyzed by the processor.

3. The communication support server of claim 1, wherein the processor is configured to transmit, to the first terminal device, the degree of good feeling of the second user for the first user.

4. The communication support server of claim 1, wherein the processor determines whether the assistance related to the input of the another message is necessary for the first user or the second user, based on the degree of good feeling together with the content of the message analyzed.

5. The communication support server of claim 1, further comprising:
a memory configured to store a first message transmitted from the first terminal device and a second message transmitted from the second terminal device, wherein the processor analyzes the content of the message based on a plurality of messages stored in the memory.

6. The communication support server of claim 1, wherein the processor generates the assist message to stop the first user or the second user who has input the another message from transmitting the another message when the processor temporarily stops transmission of the another message.

7. The communication support server of claim 2, wherein the processor determines to generate the assist message for either the first user or the second user who can lead communication in accordance with the content of the message analyzed by the processor.

8. A communication support system, comprising:
a first terminal device used by a first user; a second terminal device used by a second user; and a communication support server connectable to the first terminal device and the second terminal device via a network,
wherein the communication support server is configured to:
analyze a content of a message transmitted from at least one of the first terminal device or the second terminal device;
determine whether assistance to stop the first user or the second user from transmitting another message is necessary in accordance with the content of the message analyzed by the communication support server;
generate an assist message to be transmitted only to the first terminal device or the second terminal device in accordance with the content of the message analyzed, if the communication support server determines that the assistance is necessary, the assist message being to stop the first user or the second user who has input the another message from transmitting the another message; and
transmit, to the first terminal device or the second terminal device, the assist message,
wherein the communication support server functions to stop transmission of the another message input by the first user or the second user in accordance with the content of the message analyzed by the processor,
the assist message informs the first user or the second user that not transmitting the another message now is better than transmitting the another message now, and the communication support server calculates a degree of good feeling of the second user for the first user based on a message transmitted from the first terminal device and a message transmitted from the second terminal device.

9. A communication support method comprising:

analyzing a content of a message transmitted from at least one of a first terminal device used by a first user or a second terminal device used by a second user, by a processor;

determining, by the processor, whether assistance to stop the first user or the second user from transmitting another message is necessary in accordance with the content of the message analyzed by the processor;

if the processor determines that the assistance is necessary, generating an assist message to be transmitted only to the first terminal device or the second terminal device in accordance with the content of the message analyzed, the assist message being to stop the first user or the second user who has input the another message from transmitting the another message; and transmitting, to the first terminal device or the second terminal device, the assist message, wherein the processor functions to stop transmission of the another message input by the first user or the second user in accordance with the content of the message analyzed by the processor, the assist message informs the first user or the second user that not transmitting the another message now is better than transmitting the another message now, and the processor calculates a degree of good feeling of the second user for the first user based on a message transmitted from the first terminal device and a message transmitted from the second terminal device.

\* \* \* \* \*